United States Patent
Reining (10) Patent No.: US 6,975,206 B2
(45) Date of Patent: Dec. 13, 2005

(54) METHOD FOR COMMUNICATION BETWEEN CENTRAL TERMINAL AND MULTIPLE TRANSPONDERS

(75) Inventor: William N. Reining, Cross Plains, WI (US)

(73) Assignee: Intellectual Property, LLC, Cross Plains, WI (US)

( * ) Notice: Subject to any disclaimer, the term of this patent is extended or adjusted under 35 U.S.C. 154(b) by 491 days.

(21) Appl. No.: 10/234,080

(22) Filed: Aug. 30, 2002

(65) Prior Publication Data

US 2004/0041695 A1 Mar. 4, 2004

(51) Int. Cl.[7] .......................... H04Q 5/22; G08C 19/00; H03K 9/06
(52) U.S. Cl. ................ 340/10.2; 340/825.64; 340/10.4; 340/10.32; 375/239
(58) Field of Search .......................... 340/10.2, 825.64, 340/10.42, 825.57, 10.4, 10.32, 825.62; 375/239

(56) References Cited

U.S. PATENT DOCUMENTS

| | | | |
|---|---|---|---|
| 5,519,381 A | 5/1996 | Marsh et al. | |
| 5,537,105 A | 7/1996 | Marsh et al. | |
| 5,557,280 A | 9/1996 | Marsh et al. | |
| 5,566,441 A | 10/1996 | Marsh et al. | |
| 5,699,066 A | 12/1997 | Marsh et al. | |
| 5,726,630 A | 3/1998 | Marsh et al. | |
| 6,359,449 B1 | 3/2002 | Reining et al. | |
| 6,456,191 B1 * | 9/2002 | Federman | 340/10.2 |
| 6,499,656 B1 | 12/2002 | Marsh et al. | |
| 6,538,563 B1 * | 3/2003 | Heng | 340/10.2 |
| 6,621,467 B1 | 9/2003 | Marsh | |
| 2002/0008633 A1 | 1/2002 | Heller | |
| 2002/0087436 A1 | 7/2002 | Guthrie et al. | |
| 2002/0153418 A1 | 10/2002 | Maloney | |
| 2003/0201321 A1 | 10/2003 | Maloney | |

FOREIGN PATENT DOCUMENTS

| | | |
|---|---|---|
| EP | 1 017 005 A2 | 7/2000 |
| WO | WO 00/72461 A1 | 11/2000 |

* cited by examiner

*Primary Examiner*—Michael Horabik
*Assistant Examiner*—Scott Au
(74) *Attorney, Agent, or Firm*—Quarles & Brady LLP (57) ABSTRACT

A method of communicating information from first and second transponders (or multiple transponders) to a central monitoring device, and a communications apparatus, are disclosed. The method includes receiving a starting indication at the transponders, determining start times for the transponders in response to that indication, and transmitting first and second sets of bursts from the first and second transponders, respectively. The bursts of the first set occur at at least some of a first set of potential transmission times within an interrogation period, and the bursts of the second set occur at at least some of a second set of potential transmission times during that period. Each of the potential transmission times of the burst sets are respectively determined in relation to the start times of the respective transponders. The potential transmission times of the respective burst sets are separated from one another by one of a bit-cell period and a multiple thereof.

21 Claims, 4 Drawing Sheets

METHOD FOR COMMUNICATION BETWEEN CENTRAL TERMINAL AND MULTIPLE TRANSPONDERS

FIELD OF THE INVENTION

The present invention relates to wireless communication systems and, more particularly, relates to a wireless communication system in which a central monitoring terminal is in communication with multiple monitored devices.

BACKGROUND OF THE INVENTION

In many situations, it is desirable to identify and monitor the status of multiple objects that are in proximity with one another. For example, in a commercial or industrial facility such as a factory or a warehouse, multiple sensors, motors, or other devices can be positioned at different locations around the facility. In such an environment, it can be desirable to monitor which of these devices are present and, if desired, which devices are operating properly, as well as to receive and transmit information from and to these devices. Similarly, in a hospital environment, it can be desirable to monitor and communicate information with numerous devices such as patient monitors, analytical devices, food carts, blood/urine samples, etc.

The use of wireless communications in any environment makes it possible for individual objects of interest to be added to, or removed from, the larger group of objects without incurring significant costs associated with installing or removing a fixed communications media. Conventional systems for providing such wireless communications employ a central transceiver (interrogator) that is in communication with the transponders. The transponders, which commonly are referred to as radio frequency identification (or "RFID") transponders (or "tags"), are capable of receiving an inquiry signal from the central transceiver and providing information back to the central transceiver in response to those inquiries.

Often the amount of information that must be communicated by way of such systems is fairly limited. For example, it may be the case that the only information that must be communicated from the objects of interest to the central monitoring terminal is information indicating the identity, presence, or on/off status of the objects of interest. Nevertheless, conventional systems for providing such communications require significant amounts of energy to be transmitted over long distances. Also, data collisions with multiple transponders can occur with only a few transponders present. Classical methods also require either significant bandwidth or very long read times when many tags are present.

In particular, the RFID transponders in conventional systems typically send information to the transceiver by way of signals employing Amplitude Shift Keying (ASK) or Frequency Modulation (FM). Because these signal formats are employed, the information signals being sent by the transponders to the transceiver are "on" (e.g., nonzero signal levels are being transmitted) from about 50% to 100% of the overall time period over which the ASK signals are being sent. Such continuous or nearly-continuous transmission signals require large amounts of energy which limits the transmission range of the system. Further, as the proportion of on time reaches such high levels, the probability of collisions between (e.g., interference among) information signals originating from different transponders becomes high as the number of transponders in communication with the transceiver increases.

In view of these limitations of conventional systems, it would be advantageous if a new system providing communications between multiple transponders and a central monitoring terminal could be designed that was more efficient than conventional systems, both in terms of the system's need for large numbers of transponders and in terms of lowering the system's demand for energy.

SUMMARY OF THE INVENTION

The present inventor has discovered a new communication method in which multiple transponders transmit information to a central monitoring terminal in the form of a pulsed packets or bursts of a sub-carrier. Bursts at two distinct subcarrier frequencies are respectively transmitted, where one subcarrier frequency signifies a data change from a low level to a high level (e.g., zero to one) in the data stream, and the other subcarrier signifies a change from a high level to a low level (e.g., one to zero) in the data stream. The bursts of all of the transponders occur within a time window or "data frame" comprising a particular set of periods or "bit-cells", where the length of the bit-cells is based upon a sub-multiple of the common continuous wave interrogation signal (frequency) from the central station.

Each of the different transponders is configured to transmit its respective burst(s) only at one or more sets of potential transmission times during the data frame. The potential transmission times of each tag occurs at the same time after the start of each successive bit-cell. Based upon the modulation method used, the transponders need not transmit bursts at each of their potential transmission times. Rather, for Non-Return-to-Zero modulation (NRZ), while the transmission of a burst signifies a change in the value of the data stream being sent, the absence of the transmission of a burst at a known potential transmission time also provides information to the central monitoring terminal, namely that the value of the data stream has remained constant since the last potential transmission time.

The timing of the sets of potential transmission times in relation to the timing of the set of bit-cells relates to the modulation method chosen (e.g., whether the potential transmission times occur at ¼ of the way through the respective bit-cells rather than ½ or ¾ of the way through the respective bit-cells) determined by the modulation method in the transponders themselves.

Each transponder is programmed with a semi-unique random seed that sets the start of its potential transmission times. In response to the brief cessation of a carrier signal provided by the central monitoring terminal, the tags will re-seed the start delay such that the potential transmission delay times of the different transponders will typically occur at sufficiently different times that the actual transmitted bursts are interleaved among one another and little or no interference among the various transponders occurs.

The central monitoring terminal is configured to read and store the information received from the transponders and to correlate information received at appropriately-spaced time intervals as being provided by the same transponder. Specifically, the central monitoring terminal transmits a continuous carrier during an interrogation period (e.g., the data frame plus some additional time) that is sufficiently long to allow for all transponders to complete their transmission sequences. Typically, assuming that one bit of data is transmitted by each transponder per bit-cell period (Manchester Modulation), the interrogation period lasts for the number of bits of data to be transmitted by each of the transponders plus one, multiplied by the bit-cell period.

During the interrogation period, the central monitoring terminal records the values associated with the bursts in memory bins corresponding to time slots. The number of memory bins/time slots is equal to or greater than the product of the number of bit-cells multiplied by the ratio of the time length of a bit-cell to the time length of the burst.

At the end of the interrogation period, all of the transponders stop sending data and go into a listen mode. The central monitoring terminal then begins to transmit checksums of the information received from the different transponders it read successfully, by way of modulating the carrier. Any transponder that receives a checksum equal to its own will disable further transmission. When all checksums have been sent, the central monitoring terminal stops providing the modulated carrier. If any transponders have not received the proper checksums from the central monitoring system, following a brief interruption of the carrier, those transponders randomly redetermine the starting times for their sequences of potential transmission times. Upon reassertion of the carrier, these transponders begin data transmission again. This sequence repeats until all of the transponders have successfully communicated their information to the central monitoring terminal.

In particular, the present invention relates to a method of communicating information from first and second transponders to a central monitoring device. The method includes receiving a starting indication at the first and second transponders, determining first and second start times for the first and second transponders, respectively, in response to the starting indication, and transmitting a first set of bursts from the first transponder and a second set of bursts from the second transponder. The bursts of the first set respectively occur at at least some of a first set of potential transmission times within an interrogation time period, and the bursts of the second set respectively occur at at least some of a second set of potential transmission times within the interrogation time period. Additionally, each of the potential transmission times of the first set are determined in relation to the first start time, and each of the potential transmission times of the second set are determined in relation to the second start time. Also, the potential transmission times of the first set are separated from one another by one-of a-bit-cell period and a multiple of the bit cell period, and the potential transmission times of the second set are separated from one another by one of the bit cell period and a multiple of the bit cell period.

The present invention additionally relates to a communications apparatus that includes a central monitoring device and a plurality of transponders. The central monitoring device is capable of receiving signals transmitted at first and second sideband frequencies, and capable of transmitting signals at a carrier frequency. The plurality of transponders are capable of receiving the signals transmitted at the carrier frequency, and further capable of sending transmission signals at the first and second sideband frequencies. Each of the transmission signals of the respective transponders includes a respective plurality of bursts occurring at at least some of a respective plurality of potential transmission times. The potential transmission times of each respective transponder are separated from one another by one of a bit-cell period and a multiple of a bit-cell period, and the potential transmission times of the transponders are at different times so that the bursts of the different transponders do not interfere with one another.

DETAILED DESCRIPTION OF THE PREFERRED EMBODIMENT

Figure 1:
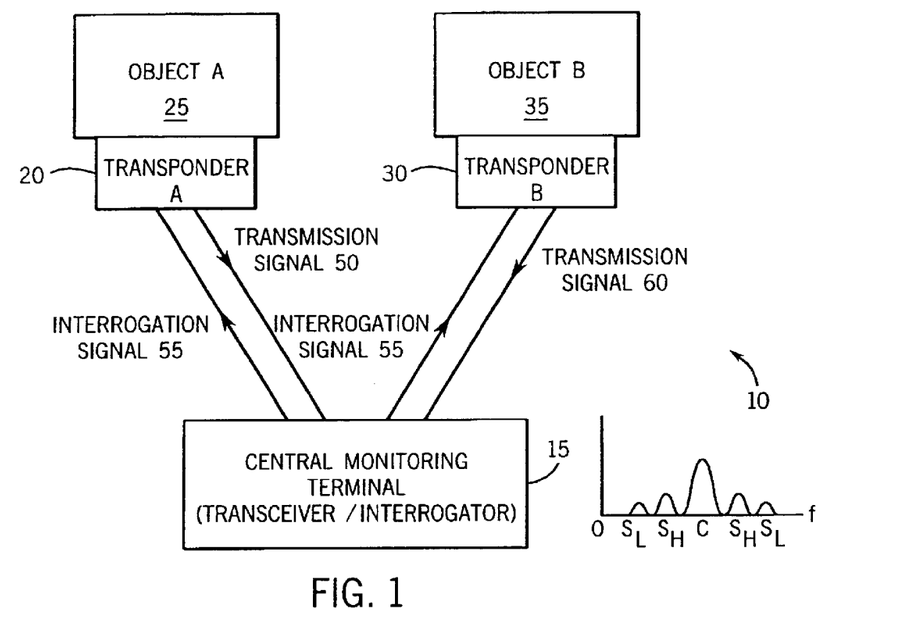
FIG. 1 is a schematic diagram showing a wireless communication system employing two transponders associated with two respective objects of interest, and a central monitoring terminal.

Referring to FIG. 1, an exemplary wireless communication system 10 employs one or more transponders or "tags" that are in communication with a central monitoring terminal 15. In the embodiment shown, first and second transponders 20 and 30, respectively, are in communication with the central monitoring terminal 15, although in alternate embodiments only one, or more than two, transponders are in communication with the central monitoring terminal. As discussed below, the present invention is particularly suited for allowing communication between a large number of (e.g., one thousand or more) transponders and the central monitoring terminal 15.

Further as shown in FIG. 1, in the present embodiment, the first and second transponders 20,30 are attached to first and second objects 25 and 35, respectively. The objects 25,35 can be any objects for which the presence or operational status may be of interest. For example, the objects 25,35 can be machine components located in a factory, items stored within a warehouse, appliances within a house, medical devices or other items in a hospital, or any of a variety of other objects. In the present embodiment, the transponders 20,30 are entirely distinct devices from the objects 25,35 to which they are attached, such that the transponders form "tags" on those objects of interest. The transponders 20,30 are not in communication with the objects 25,35, and can be attached to the objects by any conventional attachment device or technique (e.g., by screws or adhesives or implantation).

In alternate embodiments, one or more of the transponders 20,30 can be in communication with the respective objects 25,35 and receive status information therefrom, which in turn can be transmitted by the transponders to the central monitoring terminal 15. In further alternate embodiments, the transponders 20,30 are integrally formed as parts of the objects 25,35, respectively, or the objects of interest to be monitored simply are the transponders themselves. The design of the transponders and the central monitoring terminal can employ conventional components used for wireless signal transmission and reception, e.g., amplifiers, antennas, modulators, demodulators, and receivers. The components of these devices also include, in the present embodiment, signal processing components and memory devices.

Further referring to FIG. 1, in the present embodiment, the communication between the transponders 20,30 and the central monitoring terminal 15 includes two components, an interrogation signal 55 transmitted by the central monitoring terminal, and first and second transmission signals 50 and 60 transmitted by the first and second transponders, respectively. Specifically, in this embodiment, the interrogation signal 55 is transmitted at a particular carrier frequency C, while the transmission signals 50,60 are transmitted at lower and upper sidebands $S_L$ and $S_H$ about the carrier frequency (as shown in FIG. 1). So long as the transmission signals 50,60 do not include signal components at the carrier frequency (e.g., the carrier is suppressed), the interrogation signal 55 can coexist with the transmission signals without interference. In alternate embodiments, the interrogation signal 55 and the transmission signals 50,60 need not be related as carrier and sidebands, and can be other signals, so long as the interrogation signal does not interfere with the transmission signals.

Figure 2:
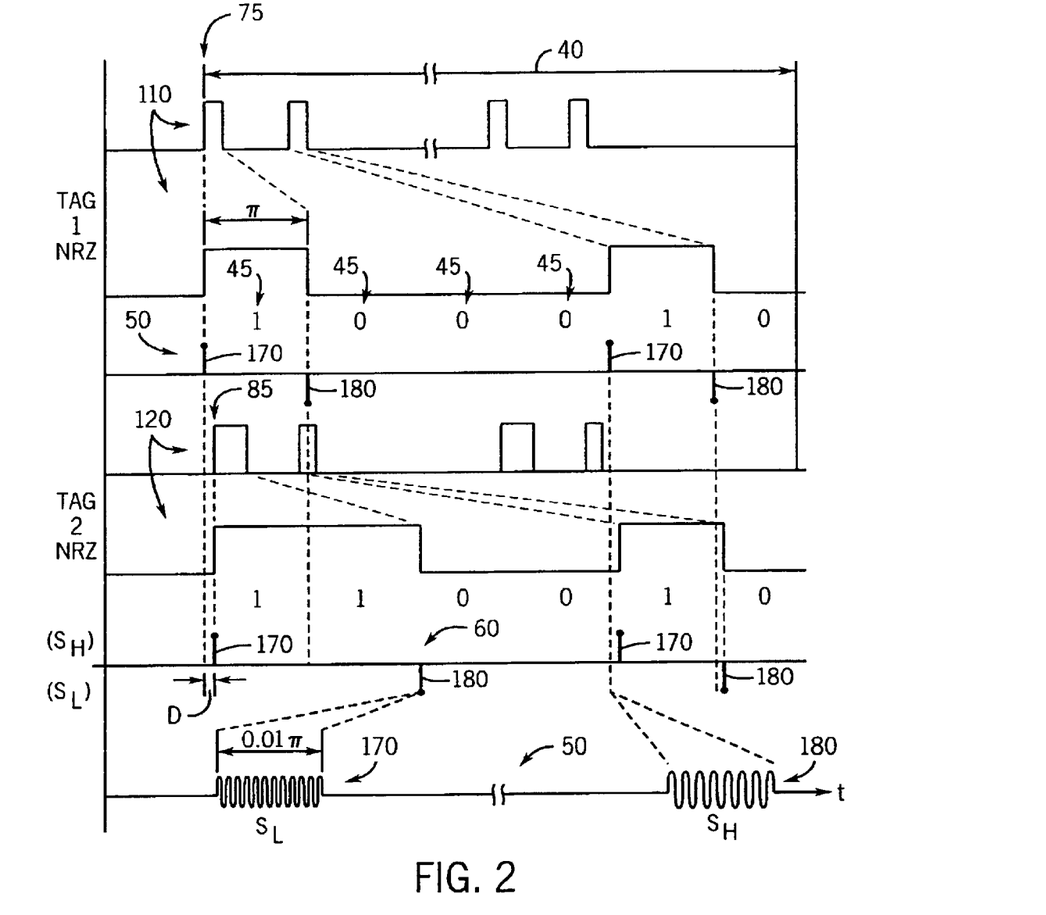
FIG. 2 is a timing diagram showing exemplary transmission signals that are transmitted by the two transponders of FIG. 1, as well as timed information signals that are the basis for the transmission signals.

Turning to FIG. 2, exemplary timed information signals 110,120 generated by the first and second transponders 20,30, respectively, are shown. The timed information signals 110,120 are data streams of binary information that are to be transmitted by the transponders 20 and 30, respectively. Additionally as shown in FIG. 2, the transmission signals 50 and 60 are each a series of pulse or bursts generated based upon the timed information signals 110, 120, respectively. As discussed above, the information being transmitted can be identification information, presence information, status information, or other types of information concerning the objects 25,35 and/or the transponders 20,30. Each of the timed information signals 110,120 is shown in two views, one which shows a portion of the respective timed information signal over a longer amount of time, and one which shows a portion of the respective signal over a shorter amount of time in greater detail (exploded from the view of the longer portion). Additionally, portions of the transmission signal 50,60 are shown in further detail to reveal two of the bursts transmitted as part of those signals.

As shown in FIG. 2, the transponders 20,30 communicate their entire data streams (e.g., all of their transmitted bursts) within a data frame 40, which comprises a particular number of periods or "bit-cells" 45 having a time length of Π. The time length Π of the bit-cells is based upon (typically a multiple of) the period of the carrier signal C, and is recognized by each of the transponders 20,30. The timed information signals 110,120 vary, and the transmission signals 50,60 transmit bursts, only at particular potential transmission times. In the present embodiment, the potential transmission times of each of the transponders 20,30 are one or more sets of times that occur periodically at the same frequency as the bit-cells 45. For example, as shown with respect to the timed information signal 110, the potential transmission times of the first transponder 20 occur at the beginning of each bit-cell 45. Although not shown, it is possible a transponder to have potential transmission times that occur at a multiple of the frequency of the bit-cells 45 (e.g., two potential transmission times per bit-cell). In such case, the series of multiple potential transmission times can be looked upon as multiple sets of potential transmission times, where each set includes one potential transmission time per bit-cell.

Whether the potential transmission times occur at the same frequency as the bit-cells 45, or at a multiple or fraction thereof, can depend upon the type of signal format being used. The timed information signals 110 and 120 are formatted in accordance with the NRZ signal format, and consequently only experience transitions from low to high levels or high to low levels at the beginning of new periods having the length Π. However, in alternate embodiments, one or more transponders could produce timed information signals formatted in accordance with another signal format. Such signal formats could include, for example, the Manchester format, with transitions able to occur once per bit cell (e.g., multiples of Π), and the self-clocking (RTZ) format, with transitions able to occur at ¼ or ¾ of each successive period (or other formats, such as the N of M format). The method is simply modulation independent. However, the NRZ methods allow for the greatest number of tags being used with out interference.

The timed information signals 110,120 of FIG. 2 each represent series of binary values where, e.g., a high value of a timed information signal represents a one and a low value represents a zero. For each given timed information signal 110,120, the binary value of the signal is updated whenever the signal can experience a transition in accordance with its particular signal format, e.g., whenever another potential transmission time occurs. Thus, the timed information signal 110 experiences updated binary values after the passage of each successive period Π.

Further referring to FIG. 2, the first and second transponders 20,30 are configured to output nonzero transmission signals 50,60 in the form of bursts only at times when the first and second timed information signals 110,120 respectively experience transitions in the form of rising or falling edges. In one embodiment, the burst times and polarities are obtained by differentiating the timed information signals. That is, in response to rising edges, the transponders 20,30 generate bursts at one subcarrier 170 while, in response to falling edges, the transponders generate bursts at the other subcarrier 180 (although the polarities of the bursts could be reversed in alternate embodiments). In the present embodiment, the transmission signals 50,60 represent a zero to one data change 170 as a burst at the sideband frequencies $S_H$ shown in FIG. 1, and represent the one to zero data change as a burst 180 at the sideband frequencies $S_L$ shown in FIG. 1.

As shown most clearly at the bottom of FIG. 2, the bursts 170,180 of the transmission signals 50,60 corresponding to the transitions of the timed information signals 110,120 are not instantaneous. Rather, the bursts are sinusoidal signals that have a length that is short in comparison with the bit-cell period Π (or the fractions of the period Π) at which potential transmission times occur. In one embodiment, the burst width is determined by the bit-cell width divided by the number of random seeds possible. Nevertheless, because of the relative brevity of the bursts 170,180 in comparison with the bit-cell period Π (or the fractions of the period Π) at which bursts can occur, there is significant dead time in between the successive bursts of any given transmission signal such that the bursts of the different transmission signals can be interleaved among one another without interfering with one another. For example, in the embodiment of FIG. 2, the lengths of the bursts 170 and 180 are Π/100 while the time periods in between successive bursts of each transmission signal are at least 99Π/100. Thus, it is possible for all of the pulses 170,180 of the two transmission signals 50,60 to be transmitted successively without interference between any neighboring bursts.

To avoid interference between the various transmission signals 50,60, the transmission signals must be timed so that potential transmission times of the signals (and consequently the transmitted bursts 170,180) occur at different times and are spaced apart from one another by at least a minimum amount of dead time. Specifically, the time in between successive pulses must at least be long enough to allow for oscillation in an antenna (not shown) of the central monitoring terminal 15 to die down after being excited by the first pulse. For example, in embodiments where the pulses are transmitted at the sideband frequencies $S_H$ and $S_L$ the dead time between successive bursts of any two transmission signals should be at least about 8 to 10 cycles of the carrier frequency to avoid interference between the pulses. In FIG. 2, a minimum dead time D between successive pulses is shown to be about Π/10, although in many embodiments the minimum dead time could be significantly shorter relative to the particular bit-cell period Π of the transmission signals.

In accordance with the present invention, the transponders 20,30 are programmed to randomly select the start times for their respective timed information signals 110,120/ transmission signals 50,60. Thus, in FIG. 2, the first potential transmission time (and first actual transmitted bursts 170) for the first transponder 20 is shown to occur at time 75, while the first potential transmission time (and first actual transmitted burst 170) for the second transponder 30 is shown to occur at time 85. Given the relatively short lengths of the bursts 170,180 in comparison with the bit-cell period Π, random selection of the start times of the timed information signals 110,120/transmission signals 50,60 is highly likely to result in the transponders 20,30 having potential transmission times that do not overlap, such that the transmitted bursts 170,180 of the transponders do not interfere with one another. Thus, the first two bursts 170 of the first and second transponders 20,30 of FIG. 2 are shown to be the temporal distance D apart from one another, such that the bursts do not interfere with one another.

If one increases the number of transponders and corresponding transmission signals beyond two, or one increases the lengths of the bursts in relation to the bit-cell period Π or the number of pulses that can occur per period Π in the transmission signals, the probability that random timing of the transmission signals will avoid interference between bursts decreases. Nevertheless, the number of transmission signals from different transponders that can be transmitted without interference simply by randomly selecting the starting time for the different signals is much larger than two, and can easily be in the hundreds. For example, in one embodiment, assuming a 900 MHz carrier and 90 MHz for the high subcarrier (shifted symmetrically from the carrier) and 81.8 MHz for the low subcarrier, the pulse duration of each pulse could be about 100 nanoseconds. With 1000 bits of information at a data bit rate of the carrier frequency divided by 16,536 or about 54,000 bits per second, a read time of about 0.0185 seconds would be possible without collisions between pulses. Further, the duty cycle of the transmission, allowing two pulses per bit, is about 0.00012. Consequently, it would be possible for 9,259 transponders to share the same time space if they all had unique delays. Collisions between such a large number of transponders could be avoided by use of a 14 bit stored random number seed.

Because the present invention communicates by way of transmitting short bursts that are interleaved among one another, the present invention allows for communication between many transponders and a central monitoring terminal in a manner that requires significantly less bandwidth and power than conventional systems. The actual transit time utilization of each transponder is the width of the filamentary transmissions times (bursts) multiplied by the number of bursts, and the duty cycle of each transponder is simply the number of bursts*Burst Width/data frame length in time (e.g., the period Π). Since the duty cycle of the transmitted data is small, large transmitted field strengths back to the central terminal are possible while maintaining very low (average) operating currents in the transponders. That is, because the duty cycle is much shorter than in conventional systems, the same amount of information can be transmitted using much less energy than would be required in conventional systems.

Figure 3:
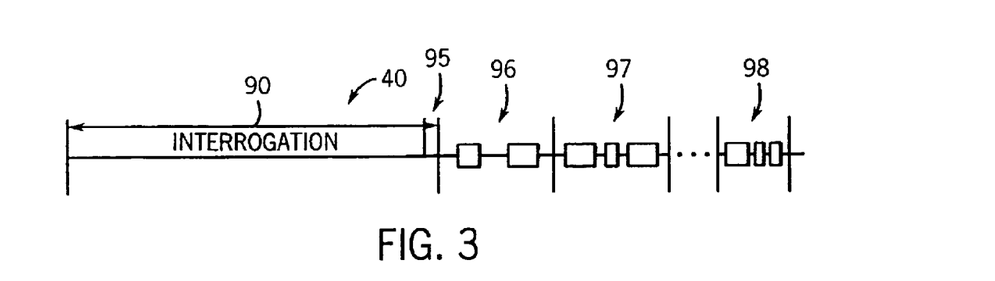
FIG. 3 is a timing diagram showing, in schematic form, the signal output of the central monitoring terminal.

Turning to FIG. 3, a timing diagram shows, in schematic form, the signal output of the central monitoring terminal 15 in relation to the transponders 20,30. Specifically, the interrogation process begins when the central monitoring terminal 15 switches on the transmission of the interrogation signal 55, that is, the carrier signal C. This signal typically then remains on for an interrogation period 90, which is equal in length to the data frame 40 plus one additional bit-cell period Π 90. The interrogation period 90 exceeds the data frame 40 by the additional period 90 because the randomly-selected startup times for the different transponders can delay the transmission signals of the transponders by up to one bit-cell period Π (assuming that the potential transmission times of the transponders occur at the same frequency as the bit-cells, rather than at a multiple thereof).

Once the interrogation period 90 has been completed, the central monitoring terminal 15 determines checksums concerning the data received from each of the transponders. The central monitoring terminal 15 then modulates the carrier signal C to send back to the checksums to the different transponders. The checksums can be sent back sequentially, to each of the different transponders. For example, FIG. 3 shows a first checksum period 96 during which the central monitoring terminal 15 sends back checksum information corresponding to the first transponder 20, a second checksum period 97 during which the terminal sends back checksum information corresponding to the second transponder 30, and an additional checksum period 98 during which the terminal could send back additional checksum information to another transponder (not shown).

Figure 4:
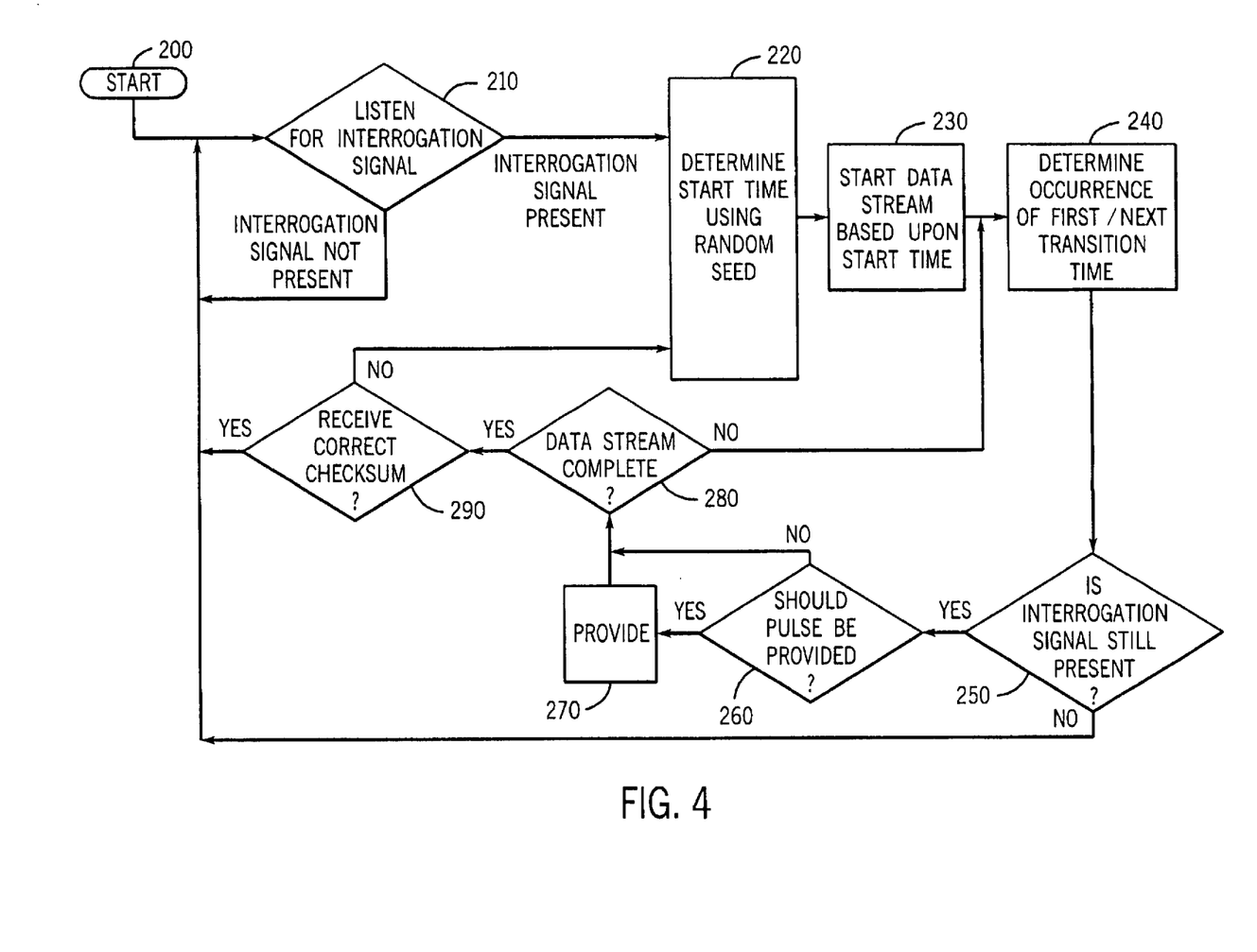
FIGS. 4 and 5 are flow charts showing exemplary steps of operation of the transponders and the central monitoring terminal of FIG. 1, respectively.

Referring to FIG. 4, exemplary steps of operation of a transponder such as the first and second transponders 20,30 are shown. Upon starting operation at step 200, the transponder listens for the interrogation signal 55 from the central monitoring terminal 15. As long as the interrogation signal 55 is not present, the transponder remains at decision block 210 in a waiting mode. Once the interrogation signal 55 becomes present, the transponder determines randomly the start time for its corresponding timed information signal (and transmission signal and potential transmission times), at step 220. Then, at step 230, the transponder starts providing the timed information signal containing the data that is to be transmitted, based upon the randomly selected start time.

Next, at step 240, the transponder determines whether a potential transmission time is occurring (or is about to occur) in accordance with the particular signal format that is being employed (e.g., NRZ, Manchester, etc.) and the bit-cell period Π of operation. Then, at step 250, the transponder again determines whether the interrogation signal 55 continues to be present. If the interrogation signal 55 no longer is present, the transponder returns to the waiting mode in which it again listens for the interrogation signal (step 210). If the interrogation signal 55 continues to be present, the transponder then determines at step 260 whether a burst should be transmitted at the particular potential transmission time that is occurring. In the embodiment discussed with reference to FIGS. 2 and 3, bursts are only transmitted as part of the transmission signals 50,60 when rising or falling edges occur in the timed information signals 110,120. That is, if a timed information signal remains constant through a potential transmission time, then no burst is transmitted at that transition time.

If the transponder determines that a burst should be provided, then the transponder transmits the burst at step 270 as part of its respective transmission signal (e.g., transmission signal 50,60). Upon providing the burst, or if the transponder determines that no burst should be provided, the transponder then determines whether the data stream is complete (which typically corresponds to whether the data frame 40 plus one bit-cell period Π, i.e., the interrogation period 90, has expired). That is, the transponder determines whether all of the data that is to be transmitted as part of its transmission signal has been sent. If at step 280 the data stream has not yet been completed and the transponder has additional information to provide, the transponder returns to step 240 to determine when another transition time occurs. However, if at step 280 it is determined that the transponder's entire data stream has been transmitted, the transponder then awaits a response from the central monitoring terminal 15 in the form of a checksum (as discussed with reference to FIG. 3). If the transponder receives the correct checksum at step 290, the transponder will have effectively completed its transmission operation, and consequently the transponder returns to the listen mode at step 210. However, if the checksum provided to the transponder is incorrect, the transponder returns to step 220 and begins retransmission of its data until such time as the interrogation signal ceases.

Figure 5:
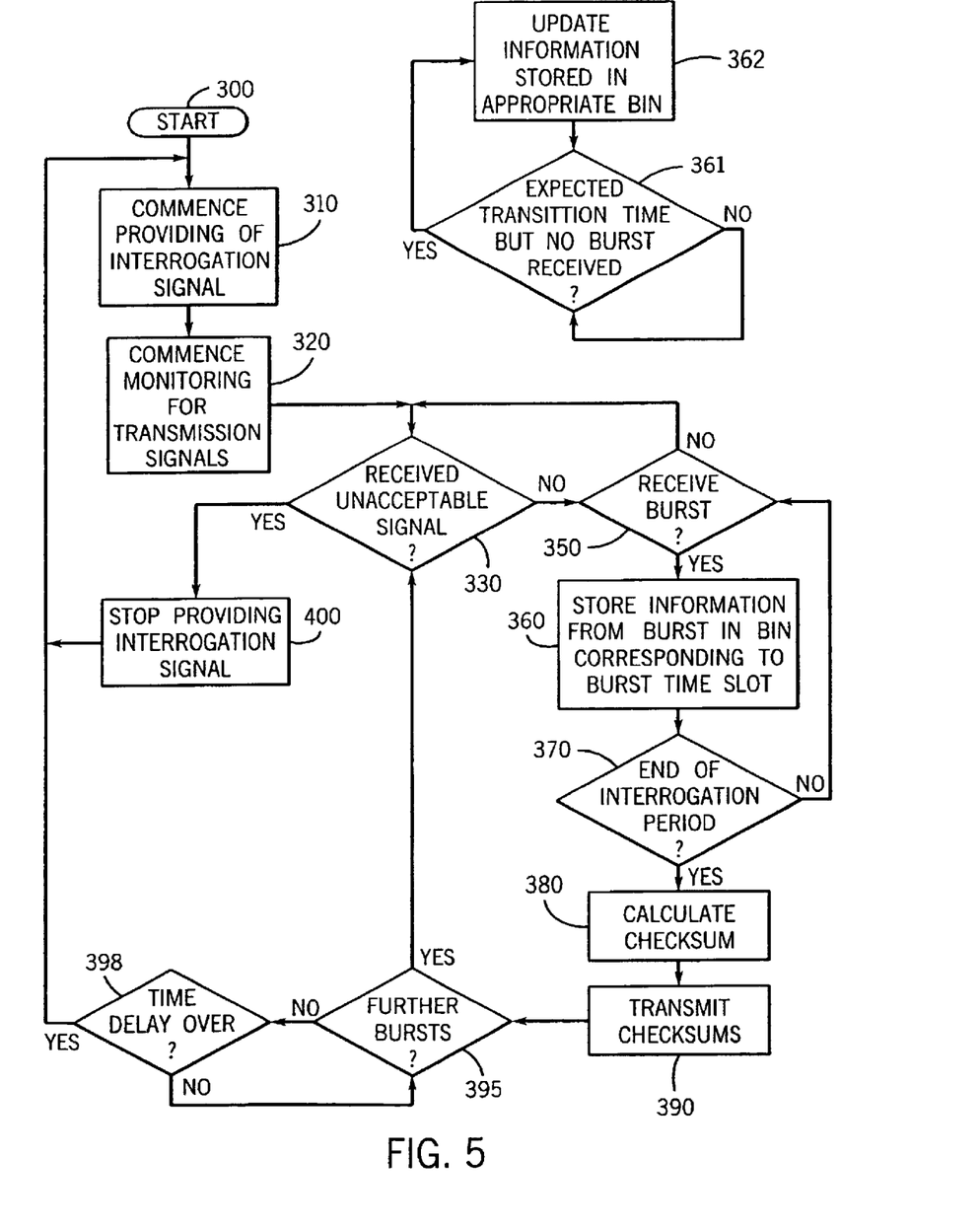

Referring to FIG. 5, exemplary steps of operation of the central monitoring terminal 15 when operating with transponders such as transponders 20,30 are shown. Upon starting operation at step 300, the central monitoring terminal 15 commences providing the interrogation signal 55, at step 310. Further, upon providing the interrogation signal 55, the central terminal 15 at step 320 then begins to monitor for transmission signals such as signals 50,60 from one or more transponders. Next, at step 330, the central monitoring terminal 15 determines whether it has received an unacceptable signal indicative of interference or improper transmission by one or more of the transponders. If this is the case, the central monitoring terminal 15 stops providing the interrogation signal 340 at step 400. Because such an unacceptable signal can have occurred because the random start times from two or more of the transponders were such that bursts from those transponders interfered with one another, the central monitoring terminal 15 in the present embodiment then returns to step 310 to restart the interrogation signal 55. By stopping and starting the interrogation signal 55 (with a sufficient delay in between, e.g., several bit-cell periods Π), all of the transponders will also restart their transmission signals at different, randomly-determined times (as discussed with reference to FIG. 4), such that the interference between bursts of the different transponders no longer is likely to exist.

As long as an unacceptable signal is not being received at step 330, the central monitoring terminal 15 monitors for bursts at step 350 (that is, the terminal cycles between steps 330 and 350). Upon receiving a burst, the central monitoring terminal 15 stores information from the burst in memory at step 360. The central terminal 15 in particular is capable of identifying and associating bursts that have been transmitted from the same transponder, even though those pulses are received at different times and are interleaved with bursts that have been transmitted from other transponders. The central monitoring terminal 15 is able to correlate bursts with transponders by associating those pulses that differ from one another in time by the bit-cell period Π (or appropriate fractions thereof, e.g., a half-period Π/2).

Figure 6:
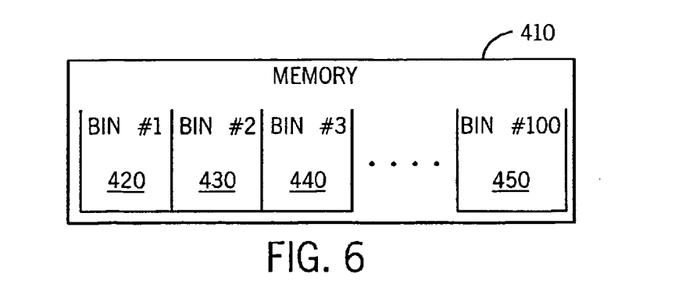
FIG. 6 is a schematic diagram of an exemplary memory of the central monitoring terminal of FIG. 1.

Referring additionally to FIG. 6, the central monitoring terminal 15 in the present embodiment includes a memory device 410 that is divided into multiple bins/arrays (e.g., bins 420–450) that correspond to different time slots within the bit-cell period Π that is common to all of the transmission signals of the different transponders. The number of bins is at least equal to the maximum number of bursts that could occur within a given bit-cell period Π (e.g., Π/burst width) or, in alternate embodiments, the maximum number of bursts that could occur without interference between neighboring bursts (e.g., Π/D). For the embodiment of FIGS. 1–2, assuming a burst width of Π/100, the memory 410 should have at least one-hundred of the bins 420–450 as shown in FIG. 6 (in which bin 450 is bin #100).

Because the bursts transmitted by each of the transponders only occur at the potential transmission times that repeat with a periodicity determined by the common bit-cell period Π (e.g., potential transmission times that occur once per period), the data stored in any given bin of the memory device 410 corresponds to a respective transponder. The number of bins associated with any given transponder will depend upon the number of potential transmission times that occur per bit-cell period Π at which that transponder can potentially send bursts, which in turn depends upon the signal format of the given transponder (e.g., a transponder transmitting in the Manchester format will typically have two bins, while a transponder transmitting in NRZ format will typically have a single bin).

Because, in the present embodiment, bursts only occur when the timed information signals 110,120 and experience rising or falling edges, the central monitoring terminal 15 also gains additional information when bursts do not occur at appropriate potential transmission times. For example, with respect to FIG. 2, the first transmission signal 50 only includes bursts at the beginning of the first, second and fifth periods but not at the beginning of the third and fourth periods. To account for the information associated with the absence of bursts, as well as the occurrence of bursts, the central monitoring terminal 15 operates to update the information stored in the bins 420–450 whenever potential transmission times occur, even when bursts do not occur.

Specifically, with respect to FIG. 5, when a potential transmission time occurs but a burst does not occur (step 361), the central monitoring terminal 15 repeats the storing of the information that was previously stored as a result of the last received burst, at step 362. For example, with respect to FIGS. 2 and 6, the values stored in the bin 420 of the memory device 410 corresponding to the first transmission signal 50 following the passage of the first six bit-cell periods will be 1,0,0,0,1,0, even though no bursts are received by the central monitoring terminal 15 at the beginning of the third and fourth periods. In this example, the central monitoring terminal 15 automatically stores a value of 0 upon the beginning of the third and fourth bit-cell periods Π, subsequent to the burst 180 occurring at the beginning of the second bit-cell period Π, since that last burst represented a value of 0.

The central monitoring terminal 15 continues to monitor for transmitted bursts until the end of the interrogation period 90, at step 370. Upon the ending of the interrogation period 90, the central monitoring terminal 15 calculates checksums corresponding to the different transponders with which central monitoring terminal is in communication, at step 380. Specifically, the central monitoring terminal 15 calculates checksums corresponding to each bin (or groups of bins containing information from the same transponder). The central monitoring terminal 15 then transmits the checksums back to the transponders by way of the carrier signal, at step 390 (corresponding to periods 96–98 of FIG. 3). The central monitoring terminal 15 then awaits, at steps 395 and 398 for one or more the transponders to resend their information if the returned checksums are not correct (as discussed with reference to step 290 of FIG. 4).

If new bursts are received within a certain time delay, the central monitoring terminal returns to steps 330–370 to continue to receive information. However, if no new bursts are received, the central monitoring terminal 15 concludes that all of the received information was correct and ends its operation (or returns to the beginning of the cycle). In alternate embodiments the central monitoring terminal 15 is able to determine by itself whether the information received from the transponders is correct or has been corrupted, without transmitting checksums back to the individual transponders. Also, in alternate embodiments, the checksums are performed by the central monitoring terminal 15 continually throughout its operation during the interrogation period 90 rather than simply at the end of the period. The checksums can be calculated by any of a number of different checksum operations (by way of a microcomputer, microprocessor or other calculation device within the central monitoring terminal).

The operations discussed with reference to FIGS. 4 and 5 are only intended to be exemplary and can vary from embodiment to embodiment. For example, in alternate embodiments, the start times for the different transponders need not be determined randomly. Also, in alternate embodiments, the transmission signals 50,60 need not be determined expressly based upon timed information signals 110,120. Rather, the transponders 20,30 (or microcomputers, microprocessors or other control devices therein) merely are configured to transmit certain pulses at particular times as determined by clocks associated with the transponders.

Also, while in the present embodiment, the transponders only check for the interrogation signal 55 during steps 210 and 250, in alternate embodiments, the transponders are continuously monitoring for the interrogation signal and operate only when the interrogation signal 55 is present. In further alternate embodiments, the transponders operate only in the absence of the interrogation signal, or in response to other (e.g., more complicated) signals than the interrogation signal. In additional alternate embodiments, the transponders send signals at all periodic transition times, rather than simply at those transition times at which a rising or falling edge of a timed information signal has occurred.

Further in alternate embodiments, the central monitoring terminal 15 stores information as to the times at which bursts are received by the central monitoring terminal, in addition to the burst information itself. By storing the times at which bursts are received, the central monitoring terminal 15 need not perform steps 361 and 362 to store data at transition times at which bursts are not received, but rather can extrapolate (after all bursts are received) the overall information received from the different transponders.

In another embodiment, the central monitoring terminal 15 will echo the last 10 bits of transponder data that were received. Starting with a start bit, the central monitoring terminal 15 will modulate the amplitude of the interrogation signal (at the carrier frequency C) in a simple 50% duty cycle binary sequence at the rate of 10 microseconds per bit with an inter-message gap of 20 microseconds. Upon receipt of a successfully read event, e.g., the last 10 bits of a number transmitted by a transponder equaling the number returned by the interrogation signal, the transponder determines that its transmission signal has been properly received and then turns itself off until the interrogation signal is turned off for more than 10 milliseconds. If a transponder does not receive a confirmation and no new messages are received after the 20 microsecond inter-message gap, then the transponder will reseed its random number and commence transmitting using the new delay value. This process is repeated until all transponders have been read.

Many other modifications and variations of the preferred embodiment which will still be within the spirit and scope of the invention will be apparent to those with ordinary skill in the art. In order to apprise the public of the various embodiments that may fall within the scope of the invention, the following claims are made.

We claim:

1. A method of communicating information from first and second transponders to a central monitoring device, the method comprising:

receiving a starting indication at the first and second transponders;

determining first and second start times for the first and second transponders, respectively, in response to the starting indication; and transmitting a first set of bursts from the first transponder and a second set of bursts from the second transponder, wherein the bursts of the first set respectively occur at at least some of a first set of potential transmission times within an interrogation time period;

wherein the bursts of the second set respectively occur at at least some of a second set of potential transmission times within the interrogation time period;

wherein each of the potential transmission times of the first set are determined in relation to the first start time, and each of the potential transmission times of the second set are determined in relation to the second start time; and wherein the potential transmission times of the first set are separated from one another by one of a bit-cell period and a multiple of the bit-cell period, and the potential transmission times of the second set are separated from one another by one of the bit-cell period and a multiple of the bit-cell period.

2. The method of claim 1, wherein the starting indication is transmitted by the central monitoring device.

3. The method of claim 1, wherein the first transponder determines the first start time by randomly selecting a first random number and adding a multiple of the first random number to a time associated with the starting indication, and wherein the second transponder determines the second start time by randomly selecting a second random number and adding a multiple of the second random number to the time associated with the starting indication.

4. The method of claim 1, wherein each of the bursts is less than one-tenth of the bit-cell in length, and wherein the bursts of the first and second sets are transmitted at different times such that the bursts do not interfere with one another.

5. The method of claim 4, wherein the potential transmission times of the first set are separated from one another by the bit-cell period and the potential transmission times of the second set are separated from one another by the bit-cell period, and wherein the interrogation time period extends for a plurality of bit-cell periods equaling a number of data bits to be provided by each of the first and second transponders plus one.

6. The method of claim 1, further comprising transmitting a third set of bursts from the first transponder, wherein the first and third sets of bursts form a series of bursts, wherein the third set of bursts occur at a third set of potential transmission times.

7. The method of claim 6, wherein the first transponder transmits in accordance with one signal format, and the second transponder transmits in accordance with another signal format.

8. The method of claim 1, further comprising ceasing transmission of the first and second sets of bursts when a complete data packet has been sent to the central monitoring terminal.

9. The method of claim 8, wherein an interrogation signal is provided by the central monitoring terminal at a carrier frequency.

10. The method of claim 9, wherein the bursts of the first set occur when changes occur in a respective first timed information signal provided by the first transponder, and wherein the bursts of the second set occur when changes occur in a respective second timed information signal provided by the second transponder.

11. The method of claim 10, wherein the first transponder provides a first transmission signal including the first set of bursts, wherein the first transmission is related to a first derivative of the first timed information signal, and wherein the second transponder provides a second transmission signal including the second set of bursts, wherein the second transmission signal is related to a first derivative of the second timed information signal.

12. The method of claim 11, wherein the bursts of the first and second transmission signals are transmitted by the first and second transponders at a first sideband frequency in relation to the carrier frequency when the bursts correspond to positive changes in the first and second timed information signals, and wherein the bursts of the first and second transmission signals are transmitted by the first and second transponders at a second sideband frequency in relation to the carrier frequency when the bursts correspond to negative changes in the first and second timed information signals.

13. The method of claim 1, further comprising:
providing a plurality of memory bins at the central monitoring device, wherein the plurality of memory bins includes a number of memory bins that is no less than a maximum number of time slots equaling a ratio of the bit-cell period to a minimum burst time.

14. The method of claim 13, further comprising:
storing data corresponding to the bursts within the memory bins as the bursts occur; and
storing data corresponding to absences of the bursts when the potential transmission times occur without occurrences of bursts.

15. The method of claim 14, further comprising:
calculating, at the central monitoring device, checksums with respect to the data stored in the respective memory bins, wherein the checksums are calculated at least at the end of the interrogation period.

16. The method of claim 15, further comprising:
transmitting the checksums from the central monitoring device back to the first and second transponders; and
retransmitting the first and second sets of bursts if the respective first and second transponders determine based upon the checksums that an error has occurred.

17. A communications apparatus comprising:
a central monitoring device capable of receiving signals transmitted at first and second sideband frequencies, and capable of transmitting signals at a carrier frequency;
a plurality of transponders capable of receiving the signals transmitted at the carrier frequency, and further capable of sending transmission signals at the first and second sideband frequencies;
wherein each the transmission signals of the respective transponders includes a respective plurality of bursts occurring at at least some of a respective plurality of potential transmission times; and
wherein the potential transmission times of each respective transponder are separated from one another by one of a bit-cell period and a multiple of a bit-cell period, and wherein the potential transmission times of the transponders are at different times so that the bursts of the different transponders do not interfere with one another.

18. The communications apparatus of claim 17, wherein each of the central monitoring device and each of the transponders includes a respective processing component including at least one of a computer, a microcomputer, a microprocessor, and a programmable logic device, and wherein each of the central monitoring device and each of the transponders includes a respective antenna coupled to the respective processing component.

19. The communications apparatus of claim 18, wherein the processing component of the central monitoring device includes a memory with a plurality of bins in which are stored information based upon bursts transmitted by the transponders.

20. The communications apparatus of claim 17, further comprising:
means for randomly selecting start times for each of the transponders, so that the respective start time for each respective transponder is at least highly likely to be different than the respective start times for the other transponders.

21. The communications apparatus of claim 20, further comprising:
means for modifying the randomly selected start times upon command from the central monitoring device.

* * * * *